Feb. 1, 1944.    S. FREED    2,340,586
TIRE TOOL
Filed Nov. 19, 1941
Fig.1
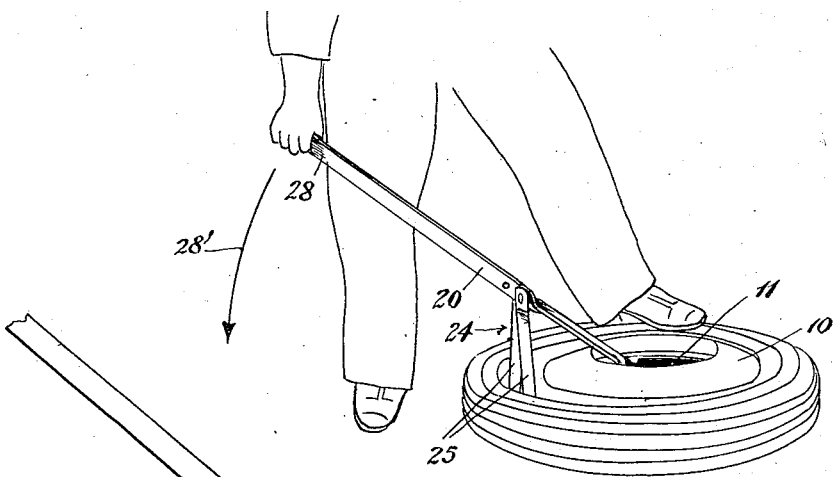
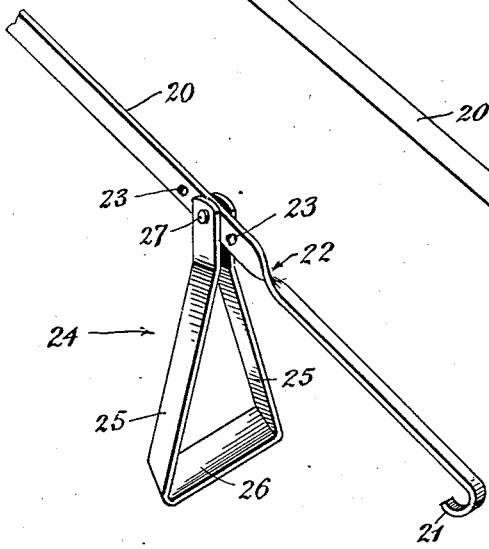
Fig.2
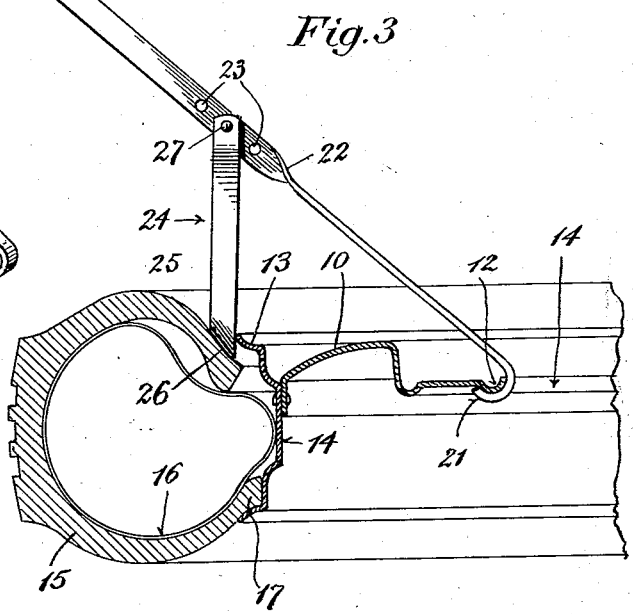
Fig.3
INVENTOR
Samuel Freed,
BY
ATTORNEYS Patented Feb. 1, 1944

2,340,586

UNITED STATES PATENT OFFICE 2,340,586

TIRE TOOL

Samuel Freed, Danbury, Conn.

Application November 19, 1941, Serial No. 419,685

3 Claims. (Cl. 157—6)

The present invention relates to a simple and efficient tire-loosening tool.

In removing a tire from a wheel, especially in wheels of the drop center type, it is necessary to deflate the tire and compress the edge or bead of the tire until it drops into the drop center, whereupon the tire at the other side of the wheel may be readily slipped over the edge thereof.

It has been found that the tire usually adheres rather strongly to the rim and it has been the practice to hammer the tire loose with large mallets to break this adhesion. The sharp blows of the hammer present a danger in that they may injure the side walls of the tires and the rim or both.

According to the present invention, this danger is obviated by providing a simple and efficient means which will break the adhesion between the tire and the rim by a gradual pressure rather than by undesirable violence and danger of hammer blows. This is accomplished by providing a tool having means at one end upon which it may fulcrum and a tire-engaging member intermediate its ends and so arranged as to produce a lever of the second class. This arrangement, for a given-length tool, provides a maximum pressure on the tire for a minimum of effort and will readily break the beads loose from the rim and move them into the position in which they can be readily released from the rim and the tire removed.

An important feature of the invention resides in the simplicity of the structure employed, and its efficiency and ease of operation.

Other features and advantages will become apparent from the specification and claims when considered in connection with the drawing, in which:

Figure 1 shows a view of the tool in use.

Fig. 2 is a perspective view of the tool, per se.

Fig. 3 is a sectional view of a tire and wheel with the tool being used thereon.

As is shown in Figs. 1 and 3, the wheel 10 is substantially a disk as it is stamped from a sheet of metal. It is provided with a hub-receiving opening 11 having a flange 12 therearound and about its periphery has a tire-receiving rim 13. The rim 13 is provided with a drop center 14. The pneumatic tire 15 has an inner tube 16, and the beads 17 of the tire normally rest in the rim 13 when the tire is inflated. After a long period of inflation, wherein the bead is pressed against the rim, a strong adhesion occurs between these elements.

In order to break this adhesion, according to the prior practices, the tire was deflated and a hammer or the like tool was employed to inflict blows on the outer casing to cause the beads to be freed from the rim so that they could be dropped into the drop center 14. This provides sufficient clearance at the opposite side of the tire to permit the tire to be slipped over the edge of the rim and the tire removed.

With the tool of the present invention, the adhesion between the tire and the rim is broken in an easy and efficient manner without the use of any hammer blows or the like, which may damage the walls of the tire.

This is accomplished by a very simple tool comprising a bar 20 adapted to have one end fulcrumed in the hub hole of the wheel and provided intermediate its ends with a tire-engaging member so as to produce a lever of the second class, as will be explained.

In the preferred form of the invention, the bar is made up of a single strip of flat rigid material. At one end a means is provided for interengaging the hub opening of the wheel so that the bar may pivot thereabout using the opening as a fulcrum point. As illustrated, this means comprises a hook 21 adapted to be positioned over the flanged edge of the hub opening. In order to provide for a maximum support for the bar, it is twisted, adjacent this end at 22, through 90° with respect to the main body thereof so that a broad flat bearing surface is presented. Intermediate the ends of the bar, there is provided a plurality of longitudinally positioned openings 23 and a tire-engaging member 24 is mounted in one of these openings in position to engage the side walls of the tire adjacent the rim.

While the tire-engaging member may take many forms, it is at present preferred to make it as a stirrup-shaped member having side legs 25 and a broad tire-engaging base 26.

The legs are secured to the bar by a bolt, rivet or other suitable pivot means 27 passing through the ends thereof and one of the selected apertures in the bar so that the stirrup member is dependent therefrom. By positioning the stirrup in a selected aperture in the bar, the tool can be employed with wheels having different distances from their hub opening to the rim.

The connection with the bar can be a loose one so that the stirrup depends therefrom by gravity, or, if the connection is relatively tight, the stirrup can be located in proper position and it will retain its position during the operation of the tool.

It will be noted in Figs. 1 and 2, that the broad tire-engaging surface 26 will distribute the pressure over a substantial area and will lie along the rim for a substantial distance so that the pressure against the wall of the tire will be exerted over a considerable part of the periphery.

The outer end of the bar 20 forms a handle 28 by which pressure can be applied to break the adhesion between the rim and bead of the tire. The arrangement of the fulcrum at one end, the handle at the other and the tire-engaging member in-between produces a lever mechanism of the second class which, for a given length of bar, will provide a maximum pressure on the tire for the amount of energy expended in operating the tool.

The tool can be operated by a single person in the manner shown in Fig. 1. It will be seen that the hooked end of the bar has been interlocked with the near edge of the hub opening. The depending stirrup member naturally falls by gravity into a position to engage the tire adjacent the rim. Upon downward pressure on the handle in the direction of the arrow 28', a continuous pressure, in contradistinction to the hammer blows of the prior art, will be applied to the tire adjacent the rim.

With the hooked end of the tool interengaged with the hub opening, there will be a tendency, when pressure is applied to the handle, to also cause the wheel to pivot about its opposite edge, as shown by the position of the wheel in Fig. 3, so that a compound action may be had at the rim to separate the elements in that the tire is forced down while at the same time the rim is lifted.

Since the tool is not secured in a fixed position on the wheel, it can be quickly slipped around the tire, and by several successive operations, break the bead loose for the full periphery of the rim. The tire thus freed from the rim can have the beads readily dropped into the drop center to be removed.

While the tool has been described herein as being used in connection with a drop center type rim, it is to be understood that it can be employed with other styles of rims to loosen the tires therefrom.

The tool of the present invention includes but a few simple parts, which can be easily and cheaply made. It can be readily adjusted for use with wheels of different diameters and can be folded into a compact unit for storage.

I claim:

1. A tool for loosening a vehicle tire from a rim of a wheel comprising a rigid lever having a hook at one end for engaging over the edge of the hub opening, an operating handle at the other end, and a plurality of longitudinally spaced apertures intermediate the ends; a stirrup-shaped member having side legs and a flat, angularly disposed tire-engaging base; and means passing through the ends of said stirrup-shaped member and one of the apertures in the lever for mounting said stirrup-shaped member in dependent relation with said lever with the tire-engaging base disposed substantially parallel with the rim with the flat base engaging the wall of the tire adjacent the rim on movement of the lever about the hooked end as a fulcrum to cause said tire wall to move axially of the wheel and be separated from said rim.

2. A tool for loosening a vehicle tire from the rim of a wheel comprising a rigid lever having a hook at one end for engaging over the edge of the hub opening of the wheel and a handle at the other end; and a member having an elongate, angularly disposed tire-engaging surface mounted intermediate the ends of the lever with the lowermost edge of the surface disposed substantially parallel with the rim to contact the tire wall adjacent the rim upon movement of the lever about the hooked end as a fulcrum to apply pressure thereto and cause said tire wall to move axially of the wheel and be separated from said rim, the angularly disposed tire-engaging surface engaging the side wall of the tire and guiding the member during tire removal.

3. A tool for loosening a vehicle tire from the rim of a wheel comprising a flat bar of rigid material disposed edgewise and having a transversely extending aperture intermediate the ends thereof, said bar being twisted through 90° adjacent one end thereof and having a bend at said end to provide a hook having a broad bearing surface to engage the edge of the hub opening of the wheel; a stirrup-shaped tire-engaging member having an angularly disposed tire-engaging surface; and means passing through the aperture for mounting the stirrup-shaped member on the bar and positioning the angularly disposed surface to engage the tire wall adjacent the rim upon movement of the bar about the hooked end as a fulcrum to cause said tire wall to move axially of the wheel and be separated from said rim.

SAMUEL FREED.